United States Patent [19]
Emkey

[11] Patent Number: 4,666,234
[45] Date of Patent: May 19, 1987

[54] NON-TAPERED, BUTT-COUPLED, FUSED-FIBER OPTICAL COUPLER AND METHOD OF FORMING THE SAME

[75] Inventor: William L. Emkey, Bethlehem, Pa.

[73] Assignees: American Telephone and Telegraph Company; AT&T Bell Laboratories, both of Murray Hill, N.J.

[21] Appl. No.: 667,379

[22] Filed: Nov. 1, 1984

[51] Int. Cl.⁴ .......................... G02B 6/26; G02B 6/42
[52] U.S. Cl. .............................. 350/96.15; 350/96.22; 65/4.1
[58] Field of Search ............... 350/96.15, 96.21, 96.22, 350/96.29; 65/4.1, 4.3; 264/1.5, 248

[56] References Cited
U.S. PATENT DOCUMENTS

| | | | |
|---|---|---|---|
| 4,083,625 | 4/1978 | Hudson | 350/96.15 |
| 4,135,779 | 1/1979 | Hudson | 350/96.15 |
| 4,179,185 | 12/1979 | Hawk | 350/96.16 |
| 4,256,365 | 3/1981 | Lemesle et al. | 350/96.15 |
| 4,291,940 | 9/1981 | Kawasaki et al. | 350/96.15 |
| 4,330,170 | 5/1982 | Johnson et al. | 350/96.16 |
| 4,360,248 | 11/1982 | Bickel et al. | 350/96.16 |
| 4,377,403 | 3/1983 | McLandrich | 65/3.11 |
| 4,433,896 | 2/1984 | Frazier | 350/96.21 |
| 4,456,330 | 6/1984 | Blüdaü | 350/96.18 |

OTHER PUBLICATIONS

"Melt Splice of Multimode Optical . . . ", *Electronics Letters*, vol. 13, No. 5, 3/3/77, Hirai et al., pp. 123–125.
"Fushion Splices for Optical Fibers . . . ", *Applied Optics*, vol. 17, No. 12, 6/15/78, Hatakeyama et al., pp. 1959–1964.
"Low-Loss Y-Coupler . . . ", *Electronics Letters*, vol. 14, No. 25, 12/7/78, Fiorina et al., pp. 808–809.
"Simple Method of Fabricating . . . ", *Applied Optics*, vol. 19, No. 12, 6/15/80, Pavlopoulos et al., pp. 1900–1903.

*Primary Examiner*—William L. Sikes
*Assistant Examiner*—Robert E. Wise
*Attorney, Agent, or Firm*—Wendy W. Koba

[57] ABSTRACT

The present invention relates to a fused-fiber optical coupler, and method of forming the same, which does not require a tapering of the fibers. A two-step fusion process is utilized where initially the end sections of the plurality (N) of output fibers are fused together to create a bullet-shaped end section. The bullet-shaped end section is then butt-coupled and fused to the input fiber (or M input fibers) to form a 1×N (or M×N) fiber coupler.

11 Claims, 10 Drawing Figures

NON-TAPERED, BUTT-COUPLED, FUSED-FIBER OPTICAL COUPLER AND METHOD OF FORMING THE SAME

BACKGROUND OF THE INVENTION

1. Field of the Invention

The present invention relates to a fiber-to-fiber optical coupler and, more particularly, to a non-tapered, butt-coupled, fused-fiber coupler and method of forming the same that eliminates the problems associated with prior arrangements which utilized a tapered fiber and/or precise fiber alignment processes during the manufacture of the coupler.

2. Description of the Prior Art

As optical fiber communications becomes more prevalent, methods of improving the performance of optical fiber systems become necessary. Many of these systems are now used in what can be described as a local area network (LAN) wherein many different users are interconnected, and may also be connected to a central control unit. These interconnections thus demand an optical fiber coupler which is capable of coupling a single fiber to a group of, for example, two or three, other fibers. Several methods of fabricating optical fiber couplers are well known in the prior art. Of the various methods, the fused-fiber approach seems to have received more general acceptance, primarily because such couplers do not require the use of any auxiliary optics.

One early type of fused-fiber device for joining multimode optical fibers is disclosed in U.S. Pat. No. 4,083,625 issued to M. C. Hudson on Apr. 11, 1978. In the Hudson arrangement, a pair of optical fibers are permanently coupled with a third optical fiber using a fusion technique where the end portions of the pair of fibers are fused together in a side-by-side relationship and the endface of the third fiber is fused to the endfaces of the pair of fibers. Inherent in this arrangement is the utilization of tapering technique, an accurate coplanar alignment of the output fiber pairs, and subsequently a precise mating between the input and output fibers. This procedure also requires accurate fiber cleaving since the diameter of the fibers must be controlled.

An alternative arrangement is disclosed in U.S. Pat. No. 4,135,779 issued to M. C. Hudson on Jan. 23, 1979. Here, a variable ratio coupling device is disclosed, similar to the above-described device, with the addition of a means to provide lateral movement between the endfaces of the pair of fibers and that of the third fiber to vary the amount of light coupled between the pair of fibers and the third fiber. This arrangement, while useful with a 1-to-2 coupler, becomes difficult to accomplish with any greater number of fibers, for example a 1-to-3 coupler, where the latter type of coupler is commonly used.

The fused coupler which has has become the most prevalent is formed using a technique known as a biconical taper. This technique is described in U.S. Pat. No. 4,291,940 issued to B. S. Kawasaki et al on Sept. 29, 1981. As disclosed, this technique forms a coupler comprising a first and a second multimode fiber, each of the fibers having a biconical taper section, the biconical taper sections of the fibers being twisted around one another and fused together along a predetermined length. Couplers made in this manner have several drawbacks. In particular, the taper region is drawn to a small diameter and is suspended in air since direct contact with a potting compound can increase loss and/or affect the splitting ratio. Such an air suspension suggests potential mechanical reliability problems and further complicates hermetic and high pressure package design. Additionally, the biconical taper arrangement has not been found to be a successful way of forming $1 \times N$ couplers for $N > 2$, for nonuniform intensity distributions among the output fibers usually results.

A problem remaining in the prior art therefore, is to provide a method of forming optical couplers which can accommodate, a 1-to-N coupling need, does not require the use of a tapered section, is rugged, and may be directly potted.

SUMMARY OF THE INVENTION

The problem remaining in the prior art has been solved in accordance with the present invention, which relates to a fiber-to-fiber optical coupler and, more particularly, to a non-tapered, butt-coupled, fused-fiber coupler for coupling an input fiber to a plurality of output fibers which eliminates the problems associated with prior arrangements.

It is an aspect of the present invention to provide a method of forming an optical coupler where the end sections of the output fibers (which comprise a relatively high ratio of core to cladding) are fused together before being fused to, for example, the single input fiber core. Therefore, the excess loss between the input fibers and the plurality of output fibers is significantly reduced.

Another aspect of the present invention is to control the splitting ratio between the input fiber and the plurality of output fibers by utilizing a micropositioner to adjust the placement of the input fiber core with respect to the fused core region associated with the plurality of output fibers.

A further aspect of the present invention is the provision of an extremely rugged optical fiber coupler. Since a tapered, or "necked-down", section between the input and output fibers is not utilized, the coupling area comprises a larger width which is not as easily damaged as the tapered coupling area associated with prior art arrangements.

An additional aspect of the present invention is to provide a rugged optical coupler which, unlike the biconical tapered coupler, can be directly potted using any suitable material.

Yet another aspect of the present invention to provide an optical fiber coupler which is equally applicable to multimode and single mode fiber coupling situations.

Other and further aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

For the sake of clarity, the following description of the present invention refers to a 1×N, specifically, a 1×2, optical coupler, which may be referred to as an optical splitter. However, it is to be understood that the present invention is directed to the actual coupling technique and is equally applicable to an N×1 optical coupler, which may be referred to as an optical combiner. In fact, the present technique is applicable to an M×N coupling arrangement for mating a plurality of M input fibers to a plurality of N output fibers. Additionally, the process described below is equally applicable to both single mode and multimode coupling arrangements, as well as hybrid arrangements utilizing both single mode and multimode fibers, for example, an arrangement which uses a single mode input fiber coupled to a plurality of N multimode output fibers.

The processing steps used to form a non-tapered optical fiber coupler in accordance with the present invention are illustrated in FIGS. 1-8. The process will be described in association with forming a 1×2 coupler in order to simplify the explanation of the technique of the present invention. It is to be understood that the method described below is equally applicable to a 1×N coupler. Additionally, it is to be noted that the words "input" and "output" may be used interchangeably, depending upon whether the arrangement is to be used as an optical combiner or an optical splitter.

Figure 1:
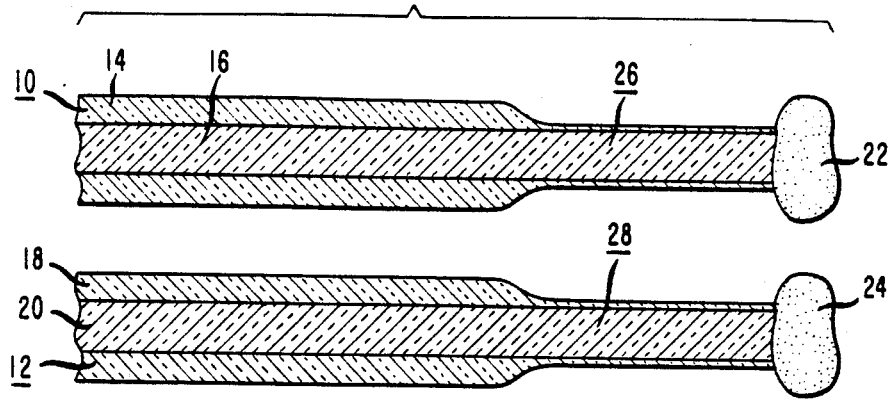
FIGS. 1–8 illustrate in sequence the formation of a $1 \times 2$ fiber coupler using the technique of the present invention.

In order to fabricate a coupler using the process of the present invention, it is necessary to have the cores of the output fibers in close proximity. Thus, for fibers with large cladding to core ratios, some of the cladding along the end section of the fiber must be removed. FIG. 1 illustrates the end-product of this removal process on a pair of output fibers 10 and 12, where fiber 10 comprises a cladding region 14 and core region 16 and fiber 12 comprises a cladding region 18 and core region 20. To remove a desired amount of cladding layers 14 and 18, fibers 10 and 12 are etched in HF acid for a predetermined period of time which will leave a small amount of cladding, for example 5 microns (used with a 62.5 $\mu$m/125 $\mu$m fiber), surrounding core regions 16 and 20. In the event that the core composition results in a preferential etch between the core and cladding, layers of protective material 22 and 24 are used to cover the ends of fibers 10 and 12, respectively, where wax may be used as this protective material. It is to be understood that if the output fibers comprise a sufficiently large core diameter in relation to the fiber outer diameter, the surrounding cladding layer may be sufficiently thin for the purposes of the present invention and no etching is required. However, many of the conventional fibers which are used today do not fall into this category, and some etching away of the cladding will be required.

Figure 2:
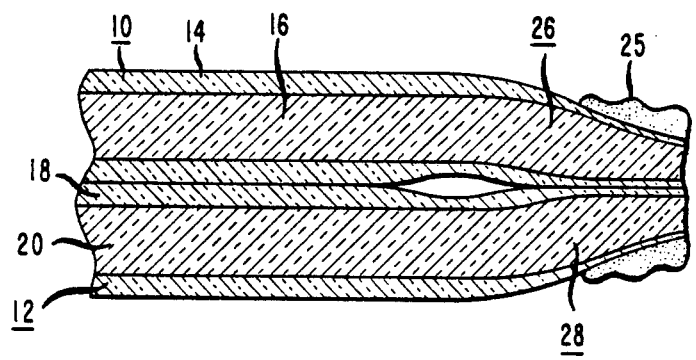
Figure 3:
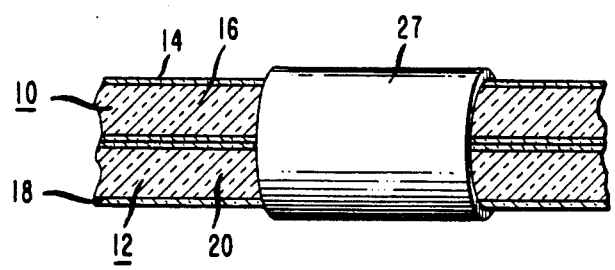

As discussed above, an aspect of the present invention is to first fuse the end sections 26 and 28 of output fibers 10 and 12 together before joining them to the input fiber. In particular, output fibers 10 and 12 must be kept in close contact during the process to insure adequate fusion. One method of keeping fibers 10 and 12 in contact is to clamp them together before and during fusion. This has not been found to be the optimal solution. Alternatively, fibers 10 and 12 may be immersed in a polymer which cures upon contact with air. FIG. 2 illustrates output fibers 10 and 12 after they have been immersed in such a polymer 25. Epo-Tek 394 Polymer, a commercially available air-curing compound, has been utilized to form the structure illustrated in FIG. 2. Alternatively, as shown in FIG. 3, a sleeve 27 may be put on fibers 10 and 12 to hold them in close proximity, where the inner diameter of the sleeve is slightly larger than the combined diameter of fiber end sections 26 and 28.

Figure 4:
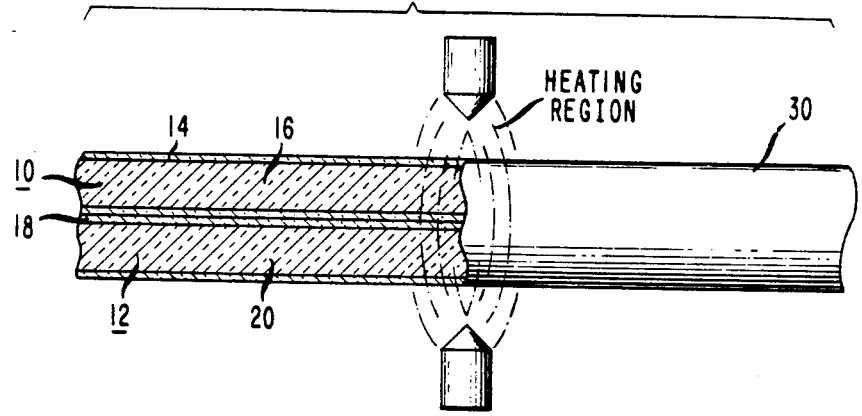
Figure 5:
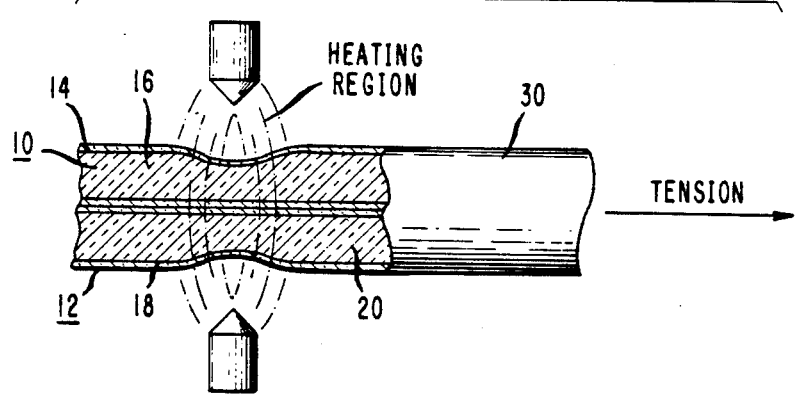
Figure 6:
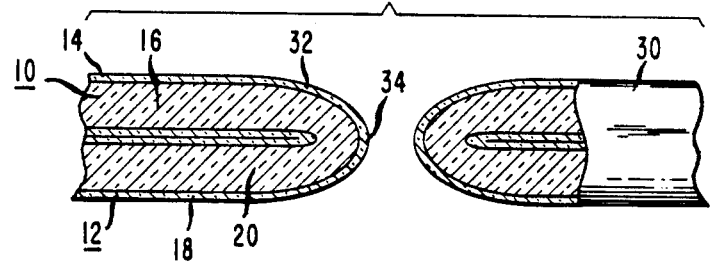

The next step in the process of forming the coupler is to fuse fiber end sections 26 and 28 together. Although it is possible to directly fuse them by placing them in a heat source, for example, an arc, it has been found that this method made it difficult to control the reproducibility and symmetry of the fused fiber ends. Therefore, in accordance with the present invention, fiber end sections 26 and 28 are first fused to the end of a "dummy" fiber 30. It has been found to be helpful, though not necessary, if the outer diameter of dummy fiber 30 is on the order of the combination of fiber end sections 26 and 28 so that all of the fibers will comprise a similar consistency during the heating process. This fusion is accomplished, as shown in FIG. 4, by placing the interface between dummy fiber 30 and fiber end sections 26 and 28 directly in the heat source (shown as electrodes, but any heat source may be used) to fuse the fibers. It is to be understood that this step is not for optical coupling, but rather to provide a mechanical link between the dummy fiber 30 and fiber end sections 26 and 28. Also, end sections 26 and 28 need not be coplanar when attached to dummy fiber 30. The fibers are subsequently translated so that only fiber end sections 26 and 28 are in the heating region, as illustrated in FIG. 5. Output fiber end sections 26 and 28 are now fused while longitudinal tension is applied to remove dummy fiber 30 from the coupled portions of fibers 10 and 12. FIG. 6 illustrates the end result of this step in the process. As seen in FIG. 6, the end result is a uniform "bullet" shape 32 of fiber end sections 26 and 28. It is to be noted that the shape of the "bullet" 32 is a function of a combination of factors including fiber composition, heating temperature, pulling tension, etc. It is to be noted that this "bullet" is very distinct from the cleaved, coplanar end face structure associated with prior art arrangements.

Figure 7:
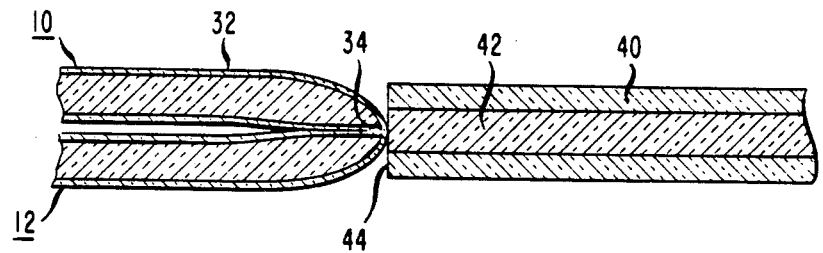
Figure 8:
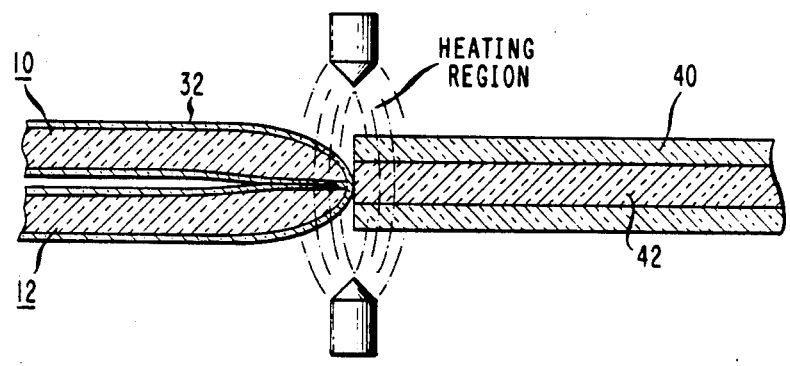
Figure 9:
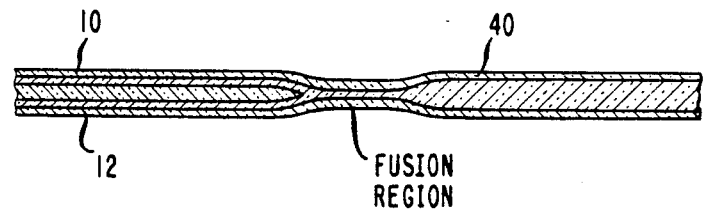
FIG. 9 illustrates a final $1 \times 2$ fiber coupler formed in accordance with the present invention.
Figure 10:
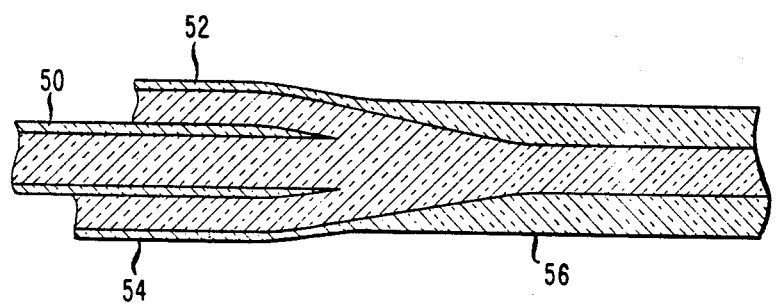
FIG. 10 illustrates a final $1 \times 3$ fiber coupler formed in accordance with the present invention.

The actual coupling between the output fibers and an input fiber is accomplished by placing bullet 32 in contact with the core of an input fiber 40, where as shown in FIG. 7, the tip 34 of bullet 32 is placed in contact with core region 42 at the endface 44 of input fiber 40. The contact point between output fibers 10 and 12 and input fiber 40 is next heated, as shown in FIG. 8, to fuse the three fibers together. The light intensity from output fibers 10 and 12 is monitored during the fusion process, and micropositioners (not shown) are utilized to control the splitting ratio as well as to minimize the excess loss. FIG. 9 contains an illustration of an exemplary 1×2 coupler formed in accordance with the present invention with a 50/50 splitting ratio. Additionally, FIG. 10 illustrates a 1×3 coupler formed in accordance with the present invention, illustrating the displacement of three output fibers 50, 52 and 54 with respect to the input fiber 56, where output fiber 50 is positioned in front of fibers 52 and 54.

Couplers made in accordance with the process of the present invention will typically exhibit a excess loss of less than approximately 1.0 dB (in some cases less than 0.2 dB), where the fiber positions may be adjusted during the final fusion process to improve alignment and uniformity in the interaction region. This manipulation, which as stated above may be accomplished with a micropositioner, also permits control of the splitting ratio to less than 0.1 dB.

What is claimed is:

1. A method for permanently coupling a plurality of M input optical fibers to a plurality of N output optical fibers to form an M×N optical coupler, the method comprising the steps of:
   (a) grouping said plurality of N output optical fibers to maintain an end section of each fiber in close proximity;
   (b) contacting a dummy fiber to the grouped end sections of said plurality of N output optical fibers;
   (c) fusing said dummy fiber to said plurality of N output optical fibers;
   (d) heating a portion of said plurality of N output optical fibers at a point removed from the fusion formed in step (c);
   (e) longitudinally pulling said dummy fiber away from said plurality of N output optical fibers so as to separate said dummy fiber and said fused region from said plurality of N output optical fibers where the separated portion of said plurality of N output optical fibers comprises a rounded non-tapered end;
   (f) contacting the plurality of M input optical fibers to said rounded end portion formed in step (e); and
   (g) fusing said plurality of M input optical fibers to said rounded end portion of said plurality of N output optical fibers to form said M×N optical coupler.

2. The method according to claim 1 wherein M=1 and N>1, so as to form an optical splitter.

3. The method according to claim 1 wherein N=1 and M>1, so as to form an optical combiner.

4. The method according to claim 1 wherein prior to performing step (a), performing the step of
   (h) removing a predetermined amount of the cladding layer from an end section of each output fiber of said plurality of N output fibers such that a predetermined thin layer of cladding remains surrounding the end portion of each output fiber core.

5. The method according to claim 1 wherein a pair of output fibers is coupled to the input fiber to form a 1×2 fiber coupler.

6. The method according to claim 1 wherein three output fibers are coupled to the input fiber to form a 1×3 fiber coupler.

7. The method according to claim 1 wherein the plurality of N output optical fibers and the plurality of M input fibers comprise multimode optical fibers.

8. The method according to claim 1 wherein the plurality of N output optical fibers and the plurality of M input optical fibers comprise single mode optical fibers.

9. The method according to claim 1 wherein the plurality of N output optical fibers comprise multimode optical fibers and the plurality of M input optical fibers comprise single mode optical fibers.

10. The method according to claim 1 wherein the plurality of N output optical fibers comprise single mode optical fibers and the plurality of M input optical fibers comprise multimode optical fibers.

11. An optical coupler formed using the method of claim 1.

* * * * *